United States Patent [19]

Nau

[11] Patent Number: 5,577,859
[45] Date of Patent: Nov. 26, 1996

[54] ARRANGEMENT FOR CONNECTING A ROTATABLE SHAFT HAVING AN END PORTION WITH CHANNEL TOOTHING FORMED THEREON AND A STRUCTURAL COMPONENT

[75] Inventor: Markus Nau, Igis, Switzerland

[73] Assignee: Etablissement Supervis, Vaduz, Liechtenstein

[21] Appl. No.: 311,304

[22] Filed: Sep. 23, 1994

[30] Foreign Application Priority Data

Sep. 24, 1993 [DE] Germany ............... 43 32 485.1

[51] Int. Cl.⁶ ........................... F16D 1/10
[52] U.S. Cl. ................. 403/325; 403/315; 403/359; 464/182
[58] Field of Search ................. 403/315, 321, 403/322, 324, 325, 359, DIG. 6; 464/35, 162, 167, 182

[56] References Cited

U.S. PATENT DOCUMENTS 4,198,080  4/1980  Carpenter .................. 403/325 X
4,289,414  9/1981  Recker ....................... 403/325 X
4,523,871  6/1985  Recker ....................... 403/322 X
4,906,123  3/1990  Weskamp et al. ............ 403/325 X
4,927,286  5/1990  Hobluigie et al. ............... 403/322

FOREIGN PATENT DOCUMENTS 0092669  11/1983  European Pat. Off. .
2735002   2/1978  Germany .
3408857   3/1984  Germany .
3835544  10/1988  Germany .

Primary Examiner—Blair Johnson
Assistant Examiner—Andrea Chop
Attorney, Agent, or Firm—Anderson Kill & Olick P.C.

[57] ABSTRACT

An arrangement for connecting a rotatable shaft having an end portion with channel toothing formed thereon, and a structural component for transmitting a torque therebetween, with the arrangement including a sleeve fixedly secured to the structured component and having inner channel toothing cooperating with the channel toothing formed on the end portion of the shaft, and a bushing enveloping the sleeve and axially displaceable therealong for providing a backlash-free engagement between the channel toothings of the end portion of the shaft and the receiving sleeve.

11 Claims, 3 Drawing Sheets

5,577,859

1

ARRANGEMENT FOR CONNECTING A ROTATABLE SHAFT HAVING AN END PORTION WITH CHANNEL TOOTHING FORMED THEREON AND A STRUCTURAL COMPONENT

BACKGROUND OF THE INVENTION

The present invention relates to an arrangement for connecting a shaft, having an end portion with channel toothing formed thereon, to a structural component for transmitting a torque therebetween. More particularly, the present invention relates to an arrangement for connecting a torque transmitting steering shaft to a cardan or universal joint of a steering column.

For reliable transmission of the torque, it is very important to avoid relative circumferential rotation between the torque transmitting shaft and the cardan joint to be able to transmit the torque without any backlash. It is also very important to insure a quick connection and disconnection of the steering shaft with the cardan joint.

Accordingly, an object of the invention is a connecting arrangement which insures the connection of the shaft with the structural component and their release without auxiliary means and tools.

A further object of the invention is a connecting arrangement which insures a backlash-free transmission of the torque between the two parts.

SUMMARY OF THE INVENTION

These and other objects of the invention, which will become apparent hereinafter, are achieved by providing an arrangement for connecting a rotatable shaft having an end portion with channel toothing formed thereon, and a structural component for transmitting a torque therebetween, with the arrangement including a sleeve fixedly secured to the structural component and having inner channel toothing cooperating with the channel toothing formed on the end portion of the shaft, and a bushing enveloping the sleeve and axially displaceable therealong.

The sleeve of the inventive arrangement includes a first portion for receiving the end portion of the shaft and having a plurality of axially extending longitudinal splines formed on an inner surface of the first portion and defining the inner channel toothing, and a second portion connected with the first portion by a divergent taper transition portion and having, in a circumferential region thereof adjacent to the transition portion, a plurality of holes. The sleeve further includes a closure member for closing the holes and displaceable within the second portion, and a spring located inside the second portion for biasing the closure member to a closing position thereof with the spring being supported, at an end thereof remote from the closure member, on a support fixedly connected with the sleeve.

The bushing includes a bore for receiving the sleeve and having a first bore portion for receiving the first portion of the sleeve and having an inner end coinciding with the transition portion of the sleeve. A groove is formed in an inner surface of the bushing bore adjacent to the inner end of the first bore portion, with a plurality of locking balls corresponding to the plurality of holes in the sleeve being located in the groove. The locking balls engage a surface of the end portion of the shaft adjacent to an end surface of the end portion in a position in which the shaft is secured in the sleeve.

2

A helical spring located in the bushing bore surrounds the second portion of the sleeve. The helical spring is supported at its opposite ends against a shoulder in the bushing bore and a surface of the structural component, respectively.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
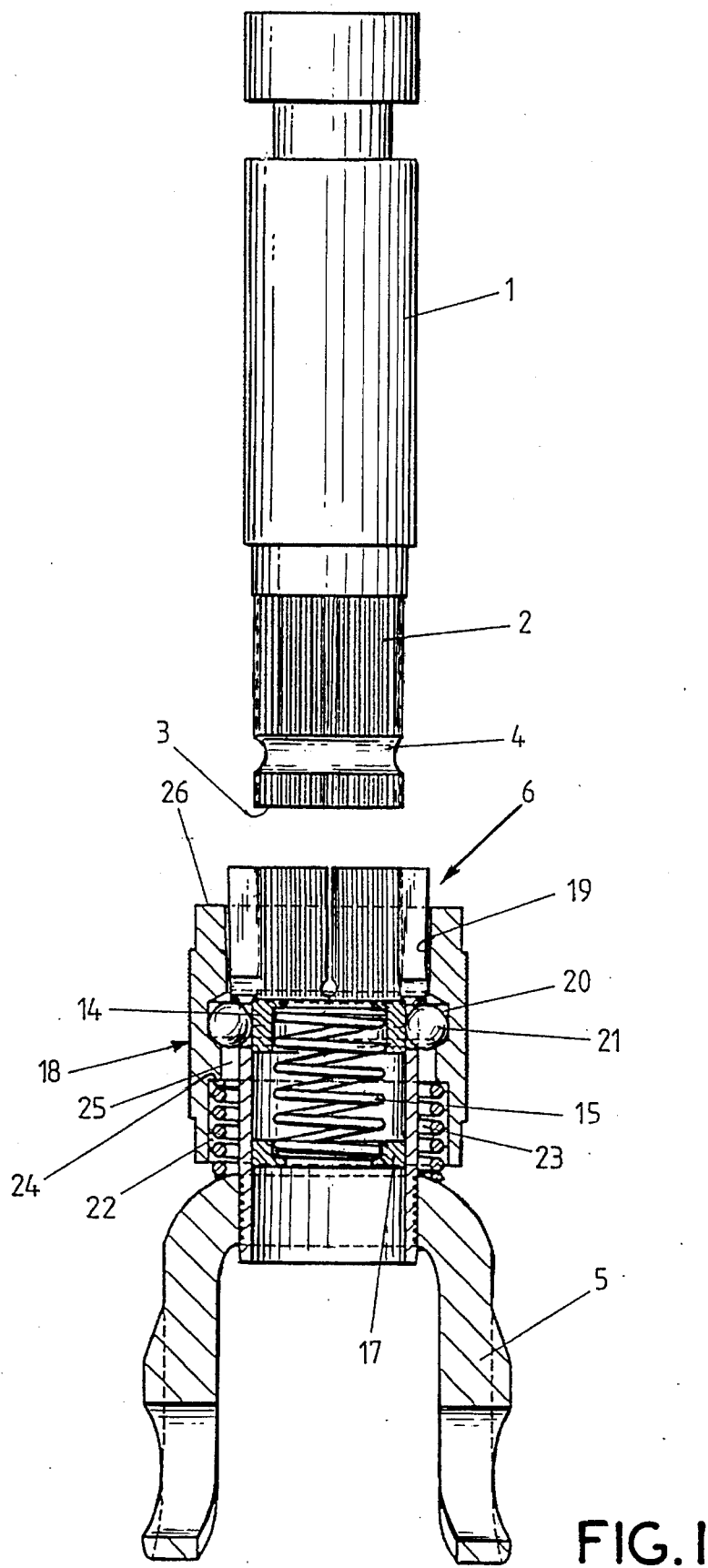
FIG. 1 is an elevational partially cross-sectional view showing an arrangement, according to the present invention, for connecting a torque transmitting shaft with a torque receiving component.
Figure 2:
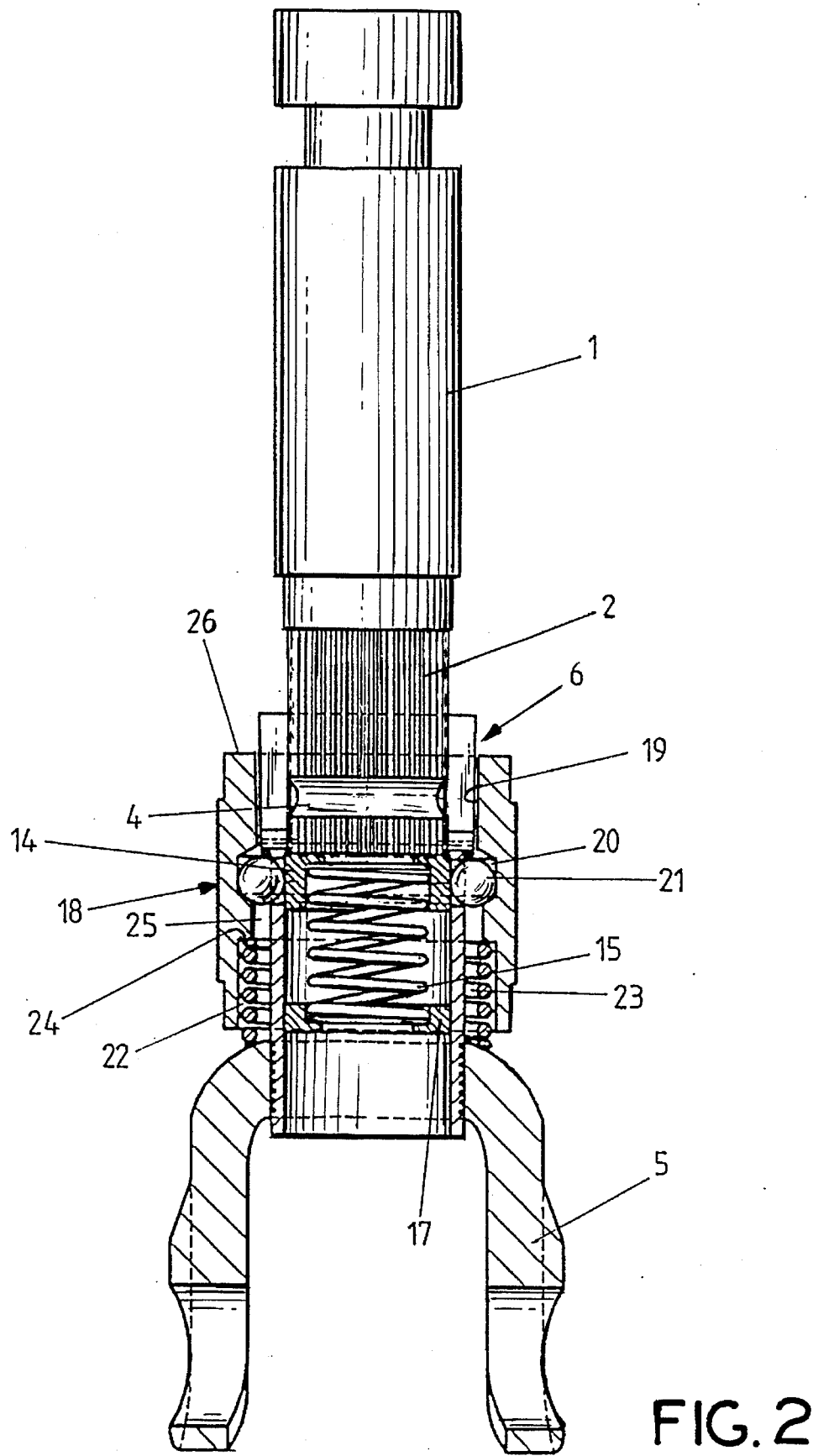
FIG. 2 is a view similar to that of FIG. 1 but showing the two parts in an assembled condition but not yet secured to each other.
Figure 3:
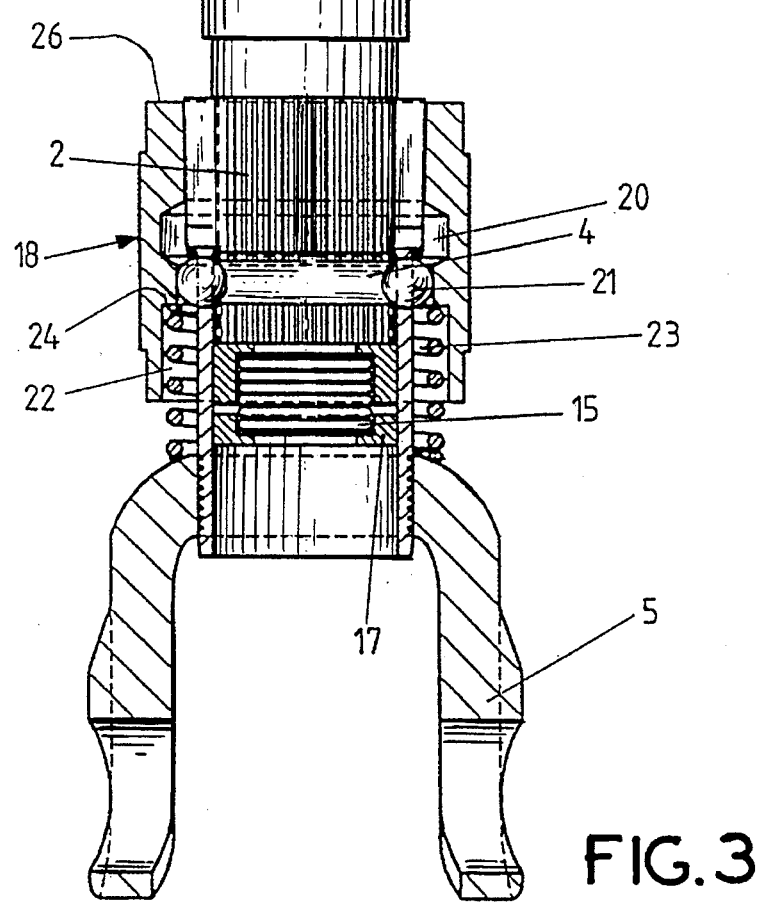
FIG. 3 is a view similar to that of FIG. 2 but showing the two parts being already secured to each other.

In FIGS. 1–3, the reference numeral 1 designates a journal shaft, for example, a steering shaft of a motor vehicle steering system. The shaft 1 has, at one of its ends, a channel toothing 2 and, adjacent to the toothing end surface 3, an annular groove 4.

Figure 4:
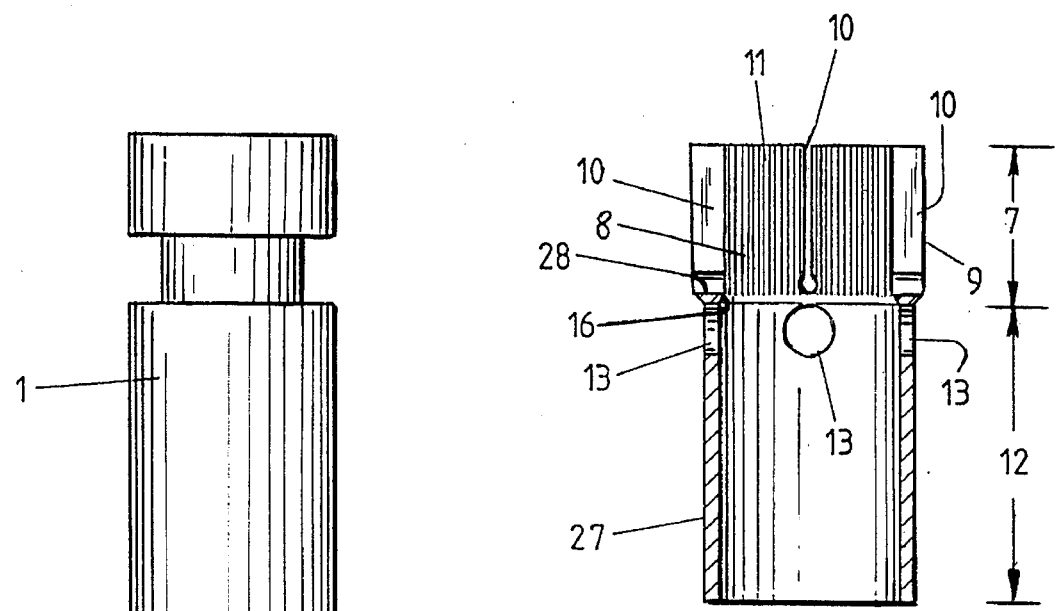
FIG. 4 is a longitudinal cross-sectional view of a sleeve of the arrangement according to the present invention.

The steering shaft 1 is connectable with a cardan or universal joint having a jaw 5. The jaw 5 is fixedly connectable, in an appropriate manner, with a sleeve 6 shown in FIG. 4. The sleeve 6 has a first portion 7 provided with inner channel toothing 8. The outer surface 9 of the sleeve 6 has a tapering portion at an end of the portion 7 opposite to the entry end side of the sleeve 6. The tapering portion may represent, e.g., a limb. A plurality of longitudinal splines 10, which extend parallel to the sleeve axis, are provided on the inner circumference of the first portion 7. The splines 10 divide the circumference of the first portion 7 into separate resilient straps 11, which define the inner channel toothing 8. The length of the channel toothing 8 corresponds to that of the channel toothing 2 of the shaft 1.

The first portion 7 of the sleeve 6 is connected with a second sleeve portion 12 having a cylindrical shape. The sleeve portion 12 has, in the region adjacent to the first sleeve portion 7, a plurality of holes 13 provided along its circumference. The second cylindrical sleeve portion 12 is fixedly connected with the cardan joint jaw 5. The length of the second sleeve portion 12 is greater than the length of the first sleeve portion 7. Inside of the second sleeve portion 12 there is provided a cup-shaped closure member 14.

The closure member 14 is biased by a spring 15 against an inner shoulder 16 of the transition region between the first and second sleeve portions 7 and 12. The axial length of the cup-shaped connection member 14 is substantially equal to the diameter of the holes 13. The spring 15 has a small spring constant and has its end opposite to the closure member 14 supported on a disc-shaped support 17, which can be secured in the sleeve 6, e.g., by a press fit. The sleeve 6 and the disc-shaped support 17 can also be manufactured as a one-piece part. A step 28 defines a transition region between the outer surface 27 of the second sleeve part 12 and that of the first sleeve part 7.

The sleeve 6 is received in a bore of a bushing 18. The bushing 18 is adapted to be axially displaceable along the sleeve 6. The bore of the bushing 18 has a bore portion 19 within which the first sleeve portion 7 is received. The inner surface of the bore portion 19 is provided, in the region adjacent to the transition region of the sleeve 6 and corresponding to the region of the sleeve 6 in which the holes 13 are formed, with an annular groove 20. A plurality of locking balls 21, corresponding to the plurality of holes 13, are arranged in the groove 20. The diameter of the locking balls 21 corresponds to the diameter of the holes 13.

A helical spring 23 is located in a bore portion 22 of the bushing 18, which is provided on a side of the groove 20 opposite to the bore portion 19. One end of the spring 23 is supported on the joint jaw 5, and the opposite end of the spring 23 is supported against an inner shoulder 24, which is provided in the bore of the bushing 18 between the groove 20 and the bore portion 22. The shoulder 24 defines an intermediate bore portion 25 the diameter of which is smaller than that of the bore portion 22. The helical spring 23 surrounds the sleeve 6. The spring constant of the spring 23 is greater than the spring constant of the spring 15 which cooperates with the closure member 14.

The depth of the groove 4, which is provided at the toothing end side of the shaft 1, is less than half of the diameter of the locking balls 21. The width of the annular space, which is limited on one side by the bottom of the groove 20 and, on the other side, by the closure member 14 in its closing position, at least corresponds to the diameter of the locking balls 21. The helical spring 23, as it has already been discussed above, is located in the widened bore portion 22, the axial length of which substantially corresponds to the length of the spring 23 in the compressed condition of the spring 23. The length of the sleeve 6 exceeds the length of the bushing 18. The groove 20 for receiving the locking balls 21 is arranged approximately in the middle region of the bushing 18.

In the pre-assembled position shown in FIG. 1, the closure member 14 is biased by the spring 15 against the shoulder 16 and closes the holes 13. As a result, the locking balls 21 are prevented from extending through the holes 13. This keeps the helical spring 23 in the compressed condition. The upper portion of the sleeve 6, that is, of the first sleeve portion 7, projects above an end surface 26 of the bushing 18.

When the two parts, the journal shaft 1 and the sleeve 6, are assembled, the toothing portion of the shaft 1 extends into the first sleeve portion 7 with the end surface 3 of the shaft 1 abutting the closure member 14. Upon further displacement of the shaft 1 into the sleeve 6, the closure member 14 will also be displaced against the biasing force of the spring 15 and, as a result, the holes 13 will become open. The locking balls 21 would extend into the holes 13 as soon as the groove 4 of the toothing portion of the shaft 1 reaches the region of the sleeve 6 in which the holes 13 are provided. This position is shown in FIG. 3.

As soon as the balls 21 extend into the holes 13 of the sleeve 6, the helical spring 23 displaces the bushing 18 along the sleeve 6 upward. The bushing 18, upon being displaced upwards, applies a radial force to the first sleeve portion 7. The radial force applied to the first sleeve portion 7 causes radial displacement of the resilient longitudinal splines 10, which firmly engage respective splines of the toothing 2 of the shaft 1 without any backlash. As a result, the shaft 1 and the sleeve 6 are secured together, on one side, by locking balls 21 which extend through the holes 13 in the sleeve 6 into the groove 4 of the shaft 1 and, on the other side, by cooperating channel toothings 2 and 8 of the two parts. Thereby, a backlash-free connection in a circumferential direction of a shaft with the shaft-receiving sleeve is insured. This is particularly important in motor vehicle steering systems.

The above-described assembly can be easily released. To this end, it is sufficient to displace the bushing 18 against the biasing force of the helical spring 23 downward until the groove 20 is located against the locking balls 21. In this position, the locking balls 21 are moved into the groove 20 and the shaft 1 can be easily withdrawn from the sleeve 6.

Though the present invention was shown and described with reference to a preferred embodiment, various modifications thereof will be apparent to those skilled in the art and, therefore, it is not intended that the invention be limited to the disclosed embodiments and/or details thereof, and departures may be made therefrom within the spirit and scope of the appended claims.

What is claimed is:

1. An arrangement for connecting a rotatable shaft, having an end portion with channel toothing formed thereon and a circumferential groove formed adjacent to an end surface of the end portion, and a structural component for transmitting a torque therebetween, said arrangement comprising:

a sleeve to be fixedly secured to the structural component and having inner channel toothing for cooperation with the channel toothing formed on the end portion of the shaft, said sleeve having a first portion for receiving the end portion of the shaft and having a plurality of axially extending longitudinal splines formed on an inner surface of said first portion and defining said inner channel toothing, and a second portion connected with said first portion by a divergent taper transition portion and having, in a circumferential region thereof adjacent to said transition portion at least one hole;

a closure member for closing said at least one hole and displaceable within said second portion;

a spring located inside said second portion for biasing said closure member to a closing position thereof, said spring being supported, at an end thereof remote from the closure member, on a support fixedly connected with the sleeve; said closure member being displaceable against a biasing force of said spring upon being acted on by the end portion of the shaft;

a locking ball extendable into said at least one hole formed in said second portion of said sleeve and into the groove formed in the end portion of the shaft for retaining said shaft in said sleeve, said locking ball having a diameter substantially equal to a diameter of said at least one hole and selected to exceed more than twice a depth of the groove formed in the end portion of the shaft;

a bushing enveloping said sleeve and axially displaceable therealong, said bushing having a bore for receiving said sleeve and having a first bore portion for receiving said first portion of said sleeve and having an inner end coinciding with said transition portion of said sleeve when said sleeve is disconnected from the shaft, and a groove formed in an inner surface of the bushing bore adjacent to said inner end of said first bore portion for receiving said locking ball; and spring means for biasing said bushing to a position in which said locking ball is displaced from said groove formed in said inner surface, upon insertion of the end portion of the shaft into said sleeve.

2. An arrangement as set forth in claim 1, wherein said first portion of said sleeve has a length shorter than a length of said second portion of said sleeve, and said transition portion comprises a tapering surface connecting outer surfaces of said first and second portions.

3. An arrangement as set forth in claim 1, wherein a width of an annular space of said bushing which is limited, on one hand, by a bottom of said groove formed in said inner surface and, on the other hand, by an upper surface of said closure member, when said closure member is in the closing position thereof, is equal at least to the diameter of said locking ball.

4. An arrangement as set forth in claim 1 wherein said closure member biasing spring is formed as a helical spring, and said support is formed as a disc which is secured in said second portion with a press fit.

5. An arrangement as set forth in claim 1, wherein said first and second portions of said sleeve have different inner diameters defining a shoulder which forms a stop for said closure member.

6. An arrangement as set forth in claim 1, wherein the bushing bore has a second bore portion forming, together with an outer surface of said second portion of said sleeve, an annular space in which said bushing biasing spring means is located.

7. An arrangement as set forth in claim 6, wherein an axial length of said annular space is approximately equal to a length of said busing biasing spring means in a compressed condition thereof.

8. An arrangement as set forth in claim 1, wherein said sleeve has a length which exceeds the length of said bushing.

9. An arrangement as set forth in claim 1, wherein said groove formed in said inner surface is located in a middle region of said bushing.

10. An arrangement as set forth in claim 1, wherein said taper transition portion of said sleeve represents a limb.

11. An arrangement as set forth in claim 1, wherein said busing biasing spring means has a spring constant larger than the spring constant of said closure member biasing spring.

* * * * *